US011113280B1

(12) United States Patent
Yu et al.

(10) Patent No.: US 11,113,280 B1
(45) Date of Patent: Sep. 7, 2021

(54) SYSTEM-WIDE QUERY OPTIMIZATION

(71) Applicant: Amazon Technologies, Inc., Seattle, WA (US)

(72) Inventors: Liang Gang Yu, Bellevue, WA (US); John Robert Smiley, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 214 days.

(21) Appl. No.: 14/973,571

(22) Filed: Dec. 17, 2015

Related U.S. Application Data

(62) Division of application No. 13/691,213, filed on Nov. 30, 2012, now Pat. No. 9,229,983.

(51) Int. Cl.
*G06F 16/2455* (2019.01)
*G06F 16/2453* (2019.01)

(52) U.S. Cl.
CPC .. *G06F 16/24542* (2019.01); *G06F 16/24545* (2019.01); *G06F 16/24554* (2019.01)

(58) Field of Classification Search
None
See application file for complete search history.

(56) References Cited

U.S. PATENT DOCUMENTS

| | | | |
|---|---|---|---|
| 6,076,174 A | 6/2000 | Freund | |
| 6,363,371 B1 | 3/2002 | Chaudhuri et al. | |
| 6,401,083 B1 * | 6/2002 | Agarwal | G06F 17/30463 |
| 6,732,085 B1 | 5/2004 | Mozes | |
| 6,917,937 B1 | 7/2005 | Rubendall | |
| 7,882,087 B2 | 2/2011 | Johnson | |
| 7,925,655 B1 | 4/2011 | Power et al. | |
| 8,108,382 B1 * | 1/2012 | Brown | G06F 16/24542 |
| | | | 707/715 |
| 8,166,021 B1 | 4/2012 | Cao et al. | |
| 8,209,664 B2 | 6/2012 | Yu et al. | |
| 8,521,867 B2 * | 8/2013 | Srinivasan | G06F 17/30516 |
| | | | 707/770 |
| 8,533,182 B1 * | 9/2013 | Charboneau | G06F 17/30979 |
| | | | 707/718 |

(Continued)

FOREIGN PATENT DOCUMENTS

| | | |
|---|---|---|
| CN | 101359340 A | 2/2009 |
| JP | H04112243 A | 4/1992 |

(Continued)

OTHER PUBLICATIONS

European Patent Application No. 13858431.3; Extended Search Report; dated Jun. 13, 2016; 10 pages.

(Continued)

*Primary Examiner* — Wilson Lee
(74) *Attorney, Agent, or Firm* — Davis Wright Tremaine LLP

(57) ABSTRACT

A locally optimized plan for executing a command using a sequence of steps can be determined for a single computing node. However, the locally optimized sequence of steps may not be optimized for a combined system comprising multiple computing nodes, any one of which may be tasked with executing the command. A plan that is optimized for the combined system may be determined by comparing the predicted cost of locally optimized plans for computing nodes in the combined system.

20 Claims, 11 Drawing Sheets

(56) References Cited

U.S. PATENT DOCUMENTS

| | | | |
|---|---|---|---|
| 9,229,983 B2* | 1/2016 | Yu | G06F 16/24524 |
| 2005/0027699 A1* | 2/2005 | Awadallah | G06Q 30/02 |
| 2005/0060285 A1 | 3/2005 | Barsness et al. | |
| 2006/0031189 A1 | 2/2006 | Muras et al. | |
| 2006/0190243 A1* | 8/2006 | Barkai | G06F 17/30486 |
| | | | 704/8 |
| 2007/0162426 A1* | 7/2007 | Brown | G06F 17/30457 |
| 2007/0239661 A1* | 10/2007 | Cattell | G06F 17/3048 |
| 2008/0010240 A1 | 1/2008 | Zait | |
| 2008/0195577 A1* | 8/2008 | Fan | G06F 17/30469 |
| 2008/0301133 A1* | 12/2008 | Brown | G06F 17/30958 |
| 2009/0282272 A1 | 11/2009 | Bestgen et al. | |
| 2009/0287666 A1 | 11/2009 | DeKimpe et al. | |
| 2010/0005340 A1 | 1/2010 | Belknap et al. | |
| 2010/0106708 A1 | 4/2010 | Burger et al. | |
| 2010/0223253 A1 | 9/2010 | Gopal et al. | |
| 2010/0235347 A1 | 9/2010 | Chaudhuri et al. | |
| 2010/0241629 A1 | 9/2010 | Tatemura et al. | |
| 2011/0010359 A1* | 1/2011 | Burger | G06F 17/30463 |
| | | | 707/718 |
| 2011/0029571 A1 | 2/2011 | Aggarwal et al. | |
| 2011/0047144 A1 | 2/2011 | Han et al. | |
| 2011/0087631 A1* | 4/2011 | Feldman | G06F 16/10 |
| | | | 707/610 |
| 2011/0103697 A1* | 5/2011 | Magai | G06K 9/4671 |
| | | | 382/195 |
| 2011/0161280 A1* | 6/2011 | Luo | G06F 17/30598 |
| | | | 707/604 |
| 2011/0258049 A1* | 10/2011 | Ramer | G06F 17/30867 |
| | | | 705/14.66 |
| 2011/0313999 A1 | 12/2011 | Bruno et al. | |
| 2012/0047158 A1 | 2/2012 | Lee et al. | |
| 2012/0089596 A1* | 4/2012 | Siddiqui | G06F 17/30463 |
| | | | 707/718 |
| 2012/0130988 A1* | 5/2012 | Nica | G06F 17/30463 |
| | | | 707/718 |
| 2012/0143847 A1 | 6/2012 | Seo et al. | |
| 2012/0166417 A1 | 6/2012 | Chandramouli et al. | |
| 2012/0173513 A1 | 7/2012 | Agrawal et al. | |
| 2012/0203762 A1* | 8/2012 | Kakarlamudi | G06F 17/30463 |
| | | | 707/718 |
| 2012/0263388 A1* | 10/2012 | Vaddadi | G06K 9/627 |
| | | | 382/225 |
| 2012/0330924 A1 | 12/2012 | Rajan et al. | |
| 2013/0022280 A1* | 1/2013 | Liu | G06K 9/4671 |
| | | | 382/224 |
| 2013/0054568 A1* | 2/2013 | Chen | G06F 17/30463 |
| | | | 707/714 |
| 2013/0151421 A1 | 6/2013 | Van Der Ploeg et al. | |
| 2013/0151491 A1 | 6/2013 | Gislason | |
| 2013/0151504 A1 | 6/2013 | Konig et al. | |
| 2013/0297586 A1* | 11/2013 | Singh | G06F 17/30442 |
| | | | 707/719 |
| 2014/0046956 A1 | 2/2014 | Zenger et al. | |
| 2014/0075004 A1 | 3/2014 | Van Dusen et al. | |
| 2014/0089294 A1* | 3/2014 | Shankar | G06F 17/30433 |
| | | | 707/718 |
| 2014/0108459 A1* | 4/2014 | Gaza | G06F 17/30289 |
| | | | 707/792 |
| 2014/0108633 A1* | 4/2014 | Dai | G06F 17/30312 |
| | | | 709/223 |
| 2014/0114952 A1* | 4/2014 | Robinson | G06F 17/30445 |
| | | | 707/718 |
| 2014/0122484 A1* | 5/2014 | Jagtiani | G06F 17/30339 |
| | | | 707/737 |
| 2014/0156632 A1 | 6/2014 | Yu et al. | |
| 2016/0350375 A1 | 12/2016 | Das et al. | |
| 2018/0060400 A1 | 3/2018 | Wu et al. | |
| 2019/0121891 A1 | 4/2019 | Fender et al. | |

FOREIGN PATENT DOCUMENTS

| | | |
|---|---|---|
| JP | 2001-331485 A | 11/2001 |
| JP | 2003316811 A | 11/2003 |
| JP | 2008112289 A | 5/2008 |
| JP | 2008-243075 A | 10/2008 |
| JP | 2012-524930 A | 10/2012 |

OTHER PUBLICATIONS

International Patent Application No. PCT/US2013/072365; Int'l Preliminary Report on Patentability; dated Jun. 11, 2015; 8 pages.
Chinese Notification of Grant of Invention Patent dated Sep. 7, 2018, Patent Application No. 201380061177.6, filed Nov. 27, 2013, 4 pages.
International Search Report and Written Opinion dated May 19, 2014, International Patent Application No. PCT/US2013/072365, filed Nov. 27, 2013, 14 pages.
Japanese First Office Action dated Dec. 10, 2018, Patent Application No. 2017-236169, filed Nov. 27, 2013, 4 pages.
Canadian Office Action dated Dec. 21, 2018, Patent Application No. 2990130, filed Nov. 27, 2013, 4 pages.
Japanese Second Office Action dated Mar. 25, 2019, Patent Application No. 2017-236169, filed Nov. 27, 2013, 2 pages.
Japanese Decision to Grant a Patent dated Jun. 21, 2019, Patent Application No. 2017-236169, filed Nov. 27, 2013, 3 pages.
Canadian Office Action dated Dec. 10, 2019, Patent Application No. 2990130, filed Nov. 27, 2013, 6 pages.
Indian First Examination Report dated Nov. 27, 2019, Patent Application No. 5720/DELNP/2015, filed Nov. 27, 2013, 6 pages.
Canadian Notice of Allowance for Patent Application No. 2,990,130 dated Oct. 20, 2020, 1 page.

* cited by examiner

SYSTEM-WIDE QUERY OPTIMIZATION

CROSS-REFERENCE TO RELATED APPLICATIONS

This application is a divisional of U.S. patent application Ser. No. 13/691,213, filed Nov. 30, 2012, now U.S. Pat. No. 9,229,983, the disclosure of which is incorporated herein by reference.

BACKGROUND

It is often desirable to implement large databases using many small computers rather than a single server with numerous processors and large memory banks. These small computers are often described as commodity hardware because, in contrast with the most powerful servers, they are relatively inexpensive, easily obtained, and readily interchangeable. However, despite the advantages of using commodity hardware, creating large databases that are scalable and efficient remains a challenging endeavor.

One technique for implementing large database systems on commodity hardware involves utilizing shards. In general terms, a shard is a computing system responsible for solving a small portion of a larger computing problem. For example, when shards are used in large-scale data management systems, tables may be divided by row into what are known as horizontal partitions. Each shard manages a partition, and responds to requests and commands involving that partition. This approach can reduce costs and have better performance when compared to traditional database systems.

However, shard-based systems can be difficult to optimize. Each shard may include an independent data management system that has a query optimizer capable of generating an execution plan for a query that runs on that shard. While the execution plan may be locally optimized for execution on that shard, it is not necessarily optimized across all shards. Because of differences in performance characteristics and the data managed by each shard, a plan that runs efficiently on one shard may run poorly on another.

DETAILED DESCRIPTION OF ILLUSTRATIVE EMBODIMENTS

The following disclosure is directed to the generation of execution plans that are optimized across multiple shards operating as database systems, state machines, workflow engines, and so forth. In various embodiments, each shard generates a locally optimized execution plan with an associated cost factor, for execution by an execution engine running on the shard. The cost factor may then be adjusted and compared with the cost factor associated with other execution plans to select a plan that is optimized considering its effects on the entire system. The adjustment to the cost factor may be based on statistics collected by the shard that generated the execution plan, statistics generated by the other shards, and the shard's relative performance characteristics among other things. The comparison of cost factors may be performed by a variety of techniques, including sequential comparison, voting, determination by a central authority, and so on.

Figure 1:
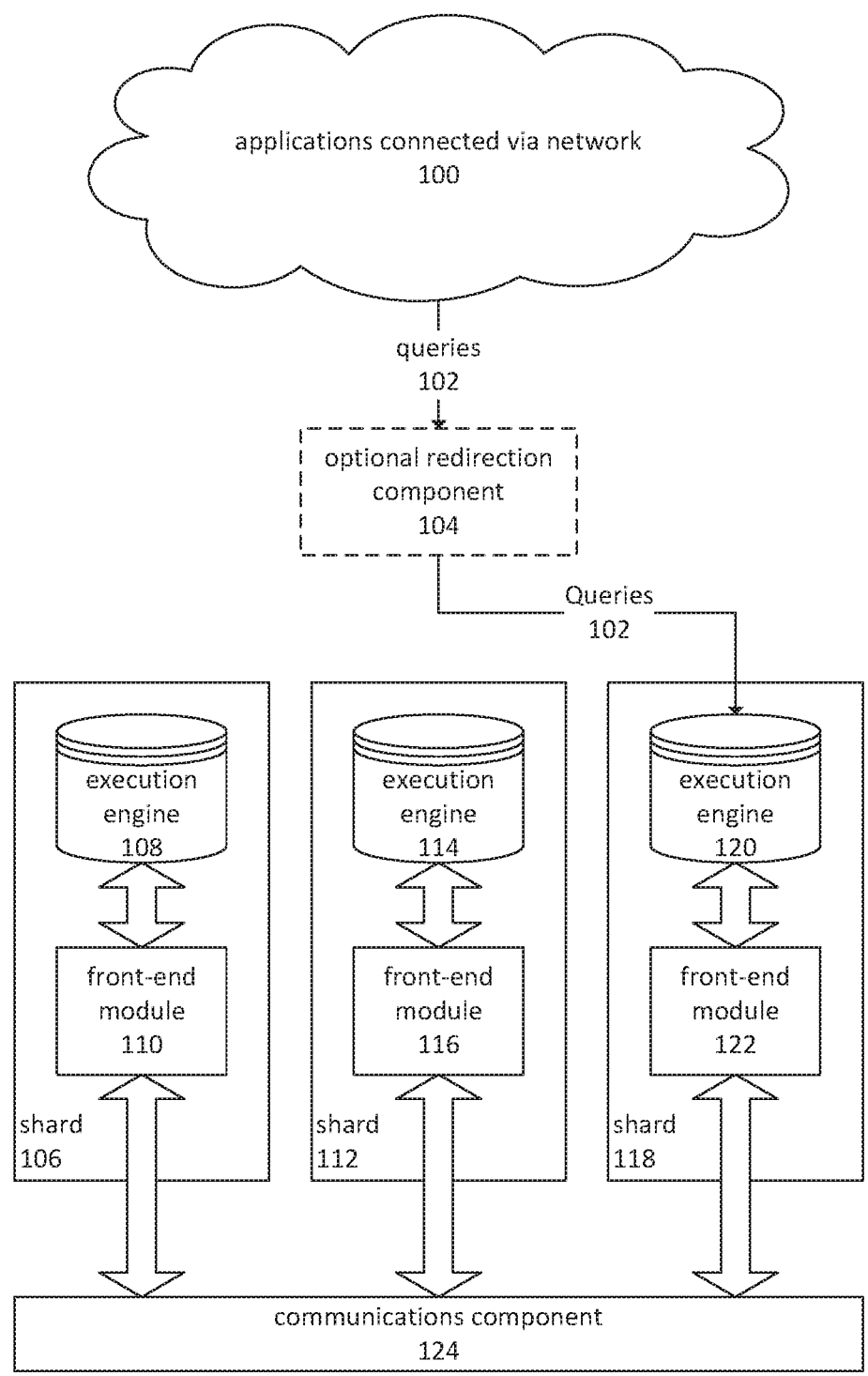
FIG. 1 depicts an embodiment of a shard-based system utilizing global query optimization.

FIG. 1 depicts an embodiment of the global optimization process. One or more client applications are connected to a shard-based system via a network 100, such as the Internet. The client applications send queries 102 to the system via a network 100. The term query is used throughout the specification to refer to any type of request or command to invoke a computing operation that may, for example, return data, change data, or cause the state of a computing process or device to change. The queries 102 may be directed to a specific shard 118, or may be routed there by an optional redirection component 104. For example, execution engine 120 running on shard 118 may receive and process the query. In various non-limiting embodiments, an execution engine may be a database, state machine, or workflow engine. The execution engine performs a set of instructions to execute the query. There may be any number of alternate sets of instructions capable of executing the same query, each set having different costs. The term cost may include, in various non-limiting examples, the time needed to perform an instruction or set of instructions, the number of CPU cycles consumed, working set, memory capacity, cache capacity, storage device read and write performance, and so on. Cost may also be influenced by factors such as the number of rows in a data set, or the amount of duplicated data. To reduce the cost of executing a query, the execution engine (sometimes through a component known as a query optimizer) may generate a locally optimized execution plan based on an attempt to minimize or reduce the predicted, i.e. estimated, cost of executing the query. However while this plan may be preferred for use on a single shard, it is not necessarily optimized system-wide. However, a front-end module 122 may share plan information and query statistics with other front-end modules 110 and 116 via a communications component 124. The communications component 124 coordinates or facilitates communication of plan information between the shards, provides adjustments to the plan information and query statistics as needed to determine the global optimization path, and enables selection of a globally optimized plan. Note that the term globally optimized refers to a plan whose use is preferred, and not necessarily to describe a plan that is mathematically or deterministically optimal.

Other embodiments described herein allow an application to use hints to optimize performance of a shard-based system. In one embodiment, the system causes the application to include, in the queries it sends to a shard, instructions that change how the query is executed on the shard. In another embodiment, the system might cause the application to include instructions that directly control the execution plan used to execute a query.

Further embodiments provide technical personnel with hints and suggestions for optimizing database performance. For example, after receiving a hint regarding a preferred execution plan, a software engineer might change application program code to issue modified queries containing suggestions to the query optimizer. These suggestions influence the plan produced by the query optimizer, so that it complies with the preferred execution plan.

Various aspects of the disclosure are described herein with regard to certain examples and embodiments, which are intended to illustrate but not to limit the disclosure. It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

Within the specification, references are made to the accompanying drawings that form a part hereof, and that show, by way of illustration, specific embodiments or examples. The drawings herein are not drawn to scale. Like numerals represent like elements throughout the several figures.

The management of large volumes of data is a common computing problem. An approach to this problem involves dividing a large set of data into smaller sets, each of which may be managed by a relatively inexpensive computing device. Each computing device may also be responsible for responding to queries operating on the set of data assigned to it. If the data managed by each computing device shares a common layout, or schema, the same query, or semantically equivalent forms of a query, may be applied to any or all of the computing devices. In addition, the same sequence of steps for resolving the query may be selected for use on all of the computing devices. This sequence, which can be referred to as an execution plan, describes a set of operations needed to satisfy the query. The sequence may be selected based on its effect on an individual computing device. However, the performance of the overall data management system may be improved if the sequence is chosen based on its effect (i.e. cost in terms of various factors such as response time, working set, CPU cycles, and so forth) on the overall data management system, and not just its effect of the sequence on any one computing device.

When designing a large data management system, it is often desirable to split workload among a number of smaller computing devices, rather than using one or two larger and more expensive devices. Each smaller computing system may be described as a shard because it represents a fragment of the overall system. The shards are grouped into what can be termed a domain, which is a collection of shards organized to collectively manage the workload. A shard may be implemented on a wide variety of computing environments, such as commodity-hardware computers, virtual machines, computing clusters, and computing appliances. Any of these computing devices or environments may, for convenience, be described as computing nodes.

Typically, each shard runs a fully independent execution engine, such as a database system, that has access to its own dedicated processors, memory, and storage devices. Systems that employ this type of independent architecture have good scalability, and are also more resilient compared to systems that share critical components. The independent architecture allows the system as a whole to continue operating even though individual shards in the domain have ceased to function. However, those of ordinary skill in the art will appreciate that deviations from a pure independent architecture are occasionally desirable or necessary. For example, the shards that comprise the larger system will often share a common network infrastructure. Although the network in this case represents a single point of failure, they are often relatively robust compared to error-prone components such as storage subsystems. Therefore, use of a common network allows for communication between the shards while retaining most of the advantages of an independent architecture.

A number of possible approaches may be employed to construct a data management system using shard-based architecture. In one approach, data tables are partitioned by row, with each range of rows assigned to a specific shard. The shard handles all requests to retrieve or store data having values that fall within the range of values assigned to the partition. This approach is referred to as horizontal partitioning. As an example, consider a table containing customer information. The customer table can be horizontally partitioned based on the customer's last name. In a two-shard domain, customers whose last names begin with 'A' through 'M' might be assigned to the first shard, and customers whose last names begins with 'N' through 'Z' might be assigned to the second.

In some cases, all tables maintained by a domain will be horizontally partitioned. However, many other configurations are possible. Some tables may be horizontally partitioned while others are replicated between shards. In other cases horizontally partitioned tables are replicated as a means of protecting against hardware failure.

When tables are horizontally partitioned, each shard will host a table having identical schema but containing different sets of data. In other words, the horizontally partitioned tables hosted on each shard share the same column layout but contain different rows of data. Because the tables on each shard share a common schema, queries may be written without regard to which shard or shards the queries will ultimately execute on.

To take advantage of the common schema, means are provided for routing queries to the shard or shards that contain the required data—multiple shards may be involved if the request involves data that spans more than one horizontal partition. Three non-limiting examples of approaches to routing queries to the correct shard are as follows. The first approach involves a centralized host that routes queries to the appropriate shard. When the centralized system receives a query, it determines the range of partitions that are potentially involved in the query. It may then forward the query to the shards that host those partitions, assemble the results, and forward them to the client. In the second approach, any shard may receive a request and process it in a manner similar to that just described. Applications may initially send the request to the shard hosting the partition most likely to contain the required data. In the third approach, applications are fully aware of both the shards and the partitioning scheme and send separate queries directly to each required shard.

When a data management system executes a query, it may perform a series of steps such as table scans, index scans, and hash-table lookups, which are the internal operations needed to produce results for the query. Collectively, these steps describe the path taken by the data management system to perform the query. More generally, they are a set of instructions taken by an execution engine to perform a query, and are referred to in this specification by the term execution plan, or for brevity by the term plan. In the database context, an execution plan may be referred to, for example, as an access path or a query plan. There are often many different possible execution plans for the same query. Each execution plan is capable of producing the same results, but their performance characteristics may vary widely. Note that the term query refers to a request for data or a command to be performed. Furthermore, a single query may have many different forms, all of which can be executed using the same execution plan. For example, the same query may be expressed using a different language, varying textual formats, or as is often the case may contain parameterized values not supplied until the command is executed. For all of these cases, the same execution plan may be used to execute all forms of the query.

Execution plans are also used by other types of execution engines, such as state machines or workflow processors. For example, a state machine may comprise a series of possible state transitions, each with an associated cost. Various paths may be traversed when moving from state 'A' to state 'Z', each of which may have a different cost.

To determine the preferred plan for executing a query on a particular shard, a component known as a query optimizer evaluates the predicted cost of following each possible execution plan. Each step in an execution plan is associated with a predicted (i.e. estimated) cost, considering factors such as the time it takes to execute the step or the computing resources it consumes. The total predicted cost of performing an execution plan may be computed based on the costs of its component steps. Branches and loops may be accounted for by considering the likelihood of a particular branch being executed and adjusting the cost factor accordingly. Typically, the total predicted cost will be expressed as a unitless scalar value or a time-based estimate. Note that the term predicted cost may also be described as an estimated cost, and is not necessarily an accurate forecast of the costs that are actually incurred.

Once the predicted costs are known, an optimized execution plan may be chosen by selecting the execution plan with the cheapest total cost. Other factors in addition to cost may also be considered. For example, it is sometimes desirable to select a plan that returns an initial set of results quickly, even if the overall plan is less efficient.

The accuracy of the cost calculation may be improved by using various statistics. These may include values such as the number of rows in a table or the number of unique values in a column. The statistics may also include measurements related to prior executions of the same execution plan. The data may be of a general nature, such as the total time spent executing a given execution plan, or it may be more granular, such as the number of disk reads involved in performing a table scan. Furthermore, statistics may reflect which branches of the execution plan are most commonly executed in practice, improving the accuracy of cost predictions.

However, the efficacy of this approach is limited on shard-based systems. Each shard is independent and has its own query optimizer and set of statistics. Therefore, on a given shard, the query optimizer will produce an execution plan that is locally optimized but not necessarily globally optimized. A globally optimized plan would maximize overall system performance, considering factors such as the cost of a given execution plan on each shard and the relative frequency with which it is executed on each shard. However, the predicted costs of locally generated plans may be misleading, because they only reflect the characteristics of the system they were generated on.

One general approach to identifying a globally optimized execution plan involves producing a locally optimized plan on each shard in a domain and then comparing the costs of each plan to determine which is globally optimized. Various approaches may be used to compare costs, such as performing direct comparison of the predicted cost of each plan, or other embodiments for comparison disclosed in this specification. Various approaches may also be employed regarding other aspects of determining a globally optimized execution plan, such as when each shard generates a locally optimized execution plan, how information about plans is shared, and how the globally optimized plan is utilized by the other shards.

In one embodiment, a shard is designated as the leader and broadcasts information about its locally optimized execution plan. If another shard compares the broadcast plan to its own plan, and finds that its own plan is superior, it may designate its own plan as the leader and broadcast information about its own plan. This process continues until no shard is able to provide a plan superior to the current leader's plan. The leading plan at the end of the process is considered to be globally optimized.

Figure 2:
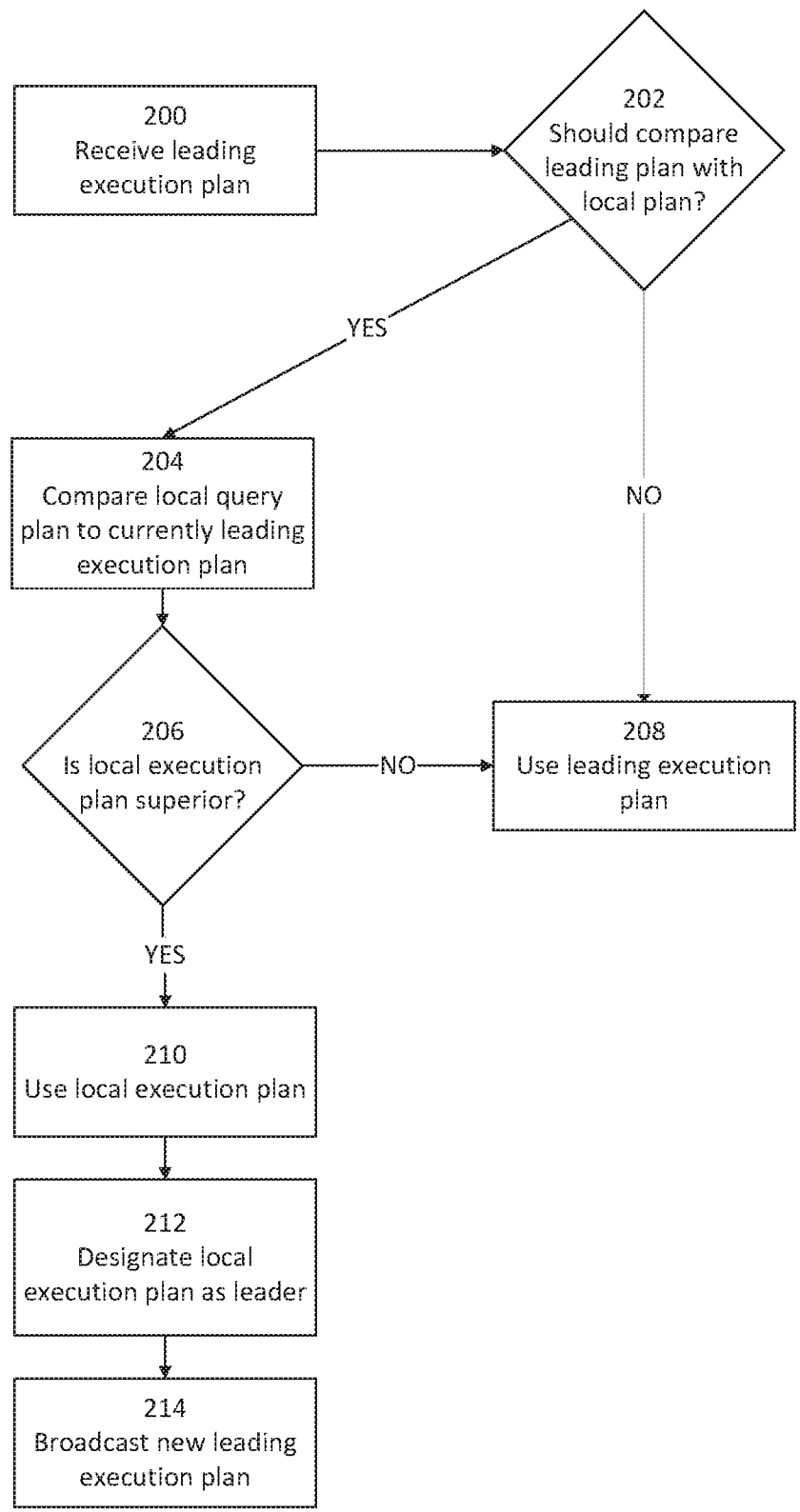
FIG. 2 depicts an embodiment for selecting a globally optimized execution plan using leader nomination and comparison.

FIG. 2 depicts an embodiment of a global optimization process. Although depicted as a sequence of operations, those of ordinary skill in the art will appreciate that various embodiments may add, remove, reorder, or modify the depicted operations. At operation 200, a shard receives information about an execution plan currently designated as the leader. The information may be similar to the data structure described by FIG. 4.

At operation 202, the shard first determines if it should compare the leading plan with its own, locally generated plan. In some cases, no local plan will have been generated when information for a leading plan is received. In such cases, a number of approaches may be taken. Various non-limiting examples include immediately generating a new plan or accepting the leading plan without comparison. In some embodiments, the shard may first begin utilizing the leading plan, while generating its own plan at some later point and then comparing it to the currently leading plan.

Alternatively, the shard may be configured to never generate an execution plan for comparison.

If operation 202 determines that a comparison should be performed, the shard generates or retrieves its own plan for the query that corresponds to the currently leading plan. The two plans are then compared, at operation 204, using one of a variety of means, including embodiments for comparing execution plans described herein. If the local plan is superior, operation 206, the shard will begin to use or keep using its own locally generated plan, operation 210. The plan is designated as the leader, operation 212, and information about the plan is broadcast to other shards, operation 214. Returning to operation 206, if the locally generated plan was not superior, the shard adopts the leading plan rather than its own, operation 208.

If operation 202 determines that a comparison should not be performed, the shard may immediately begin using the leading plan. This approach may be advantageous because it allows the shard to use a pre-existing plan without having to pause query execution while a local plan is generated. The shard may then generate its own plan at a later time, such as when the shard would otherwise be idle.

In another embodiment, the leader may be selected by sequentially evaluating the execution plans generated by the shards. A shard initially designated as the leader may send execution plan information directly to a second shard, which compares the leader's execution plan to its own. If the second shard determines that its plan is superior, it designates itself as the leader and sends information about the plan to a third shard. Otherwise, the second shard forwards the original execution plan information to the third shard. This process continues until the execution plans held by each shard have been evaluated and the last shard in the sequence designates the final leading plan as the globally optimized plan.

Figure 3:
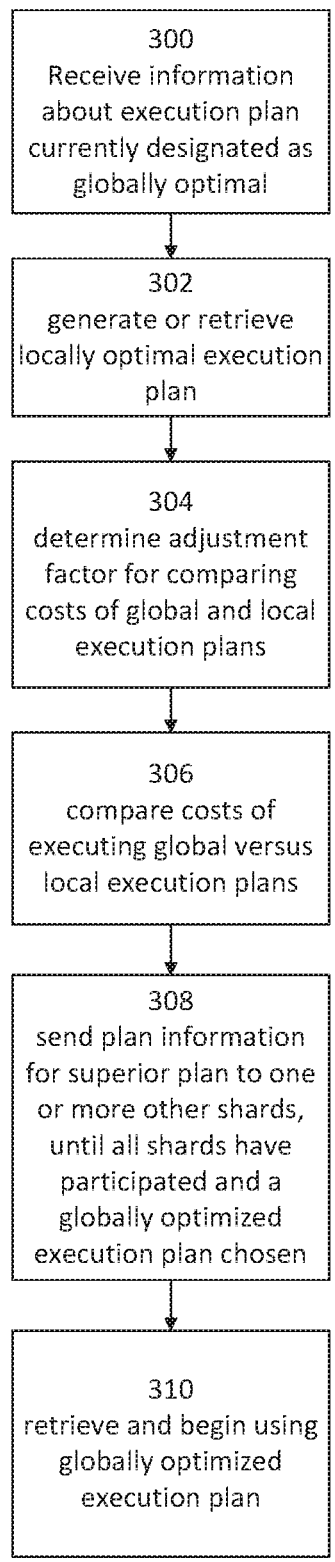
FIG. 3 depicts an embodiment for selecting a globally optimized execution plan by sequential evaluation.

FIG. 3 depicts an embodiment of global optimization by sequential evaluation. A first shard generates a locally optimized execution plan and sends information about the plan to a second shard, operation 300, with a presumption that the first plan generated is the globally optimized plan. The second shard generates its own plan, operation 302, or retrieves a plan previously generated for the corresponding query. At operation 304, a cost factor may be determined to allow for a reliable comparison between the estimated costs of the plans. The externally received and locally generated plans are then compared at operation 304. The second shard may then forward the preferred plan to the next shard, operation 306, and the process repeats until all shards have been able to evaluate the execution plan and a globally optimized plan has been determined, 308. At operation 310, the shards obtain and begin utilizing the globally optimized plan.

A further embodiment performs global query optimization by a voting process. Each shard may be assigned a number of votes based on a variety of factors, and may cast these votes in favor of its own plan being selected as the leader. The factors that may influence the number of votes available to a shard include the cost of the shard's execution plan, the frequency with which the respective query is executed, and the performance characteristics of the shard's hardware.

Figure 4:
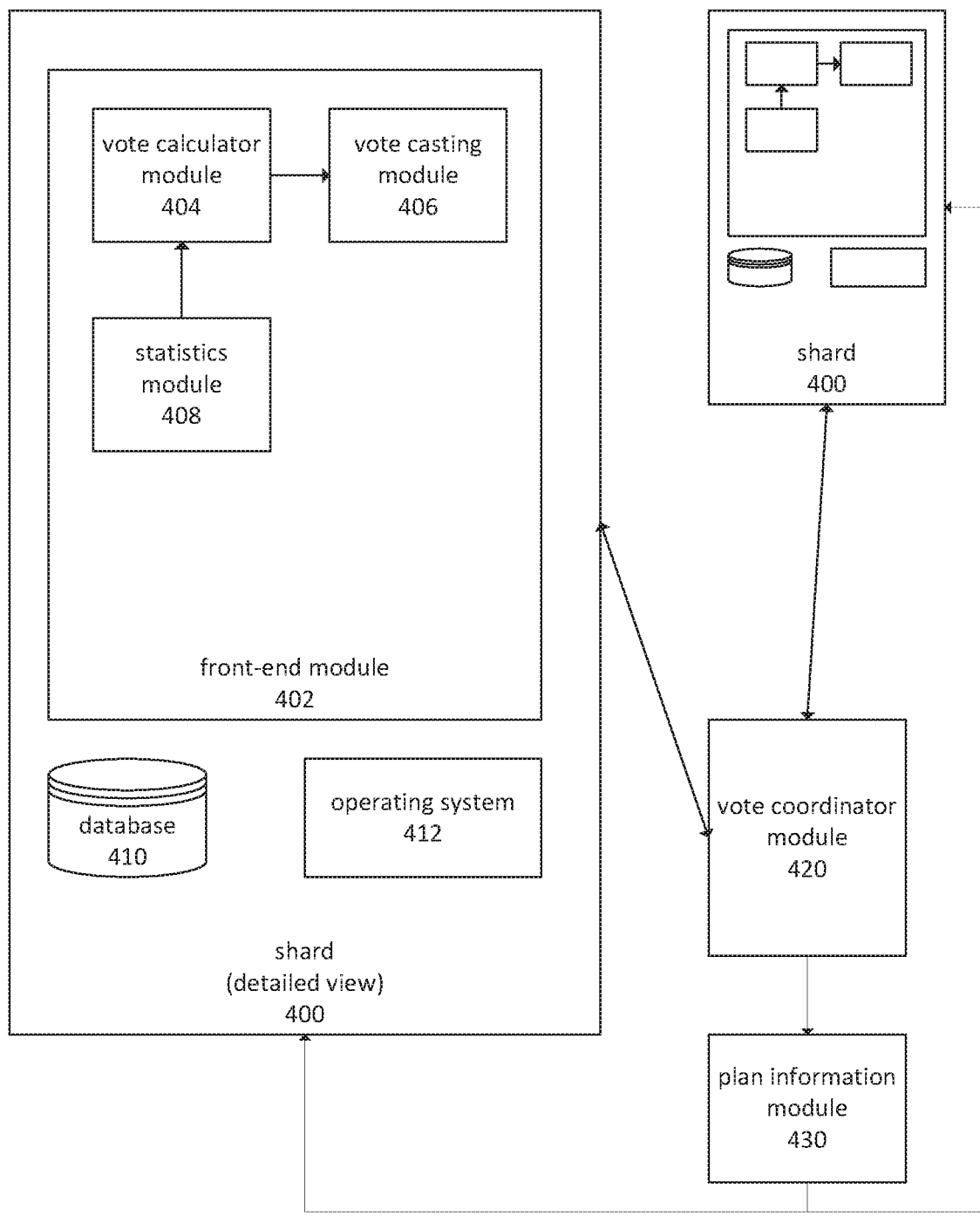
FIG. 4 depicts an embodiment for selecting a globally optimized execution plan by a voting process.

FIG. 4 depicts a system for selecting a globally optimized query by a voting process. Each shard 400 contains a front-end module 402, into which various submodules may be integrated. Those of ordinary skill in the art will appreciate that the term module may refer to an abstract unit of functionality, implemented in using means such as circuitry or software instructions stored in memory and executed by a processor. A module may be integrated into another process, program, or circuit. A module may also be incorporated into another module as a subunit of functionality.

In an embodiment, vote calculator module 404 is integrated into front-end module 402. Vote calculator module 404 determines the number of votes available by reference to statistics module 408, which in turn may obtain statistics from database 410 and the shard's operating system 412. In an embodiment, the number of votes is determined on a per-query basis with reference to one or more of the cost of the query, the performance characteristics of the shard's hardware, the amount and type of data stored on the shard, and the relative frequency with which the query is executed on the shard.

A vote coordinator module 420 initiates the voting process. Although depicted separately in FIG. 4, the vote coordinator module may be integrated into any module, such as front-end module 402. If so, each shard may contain a vote coordinator module 420 but only one is active at any given time.

When the voting process begins, each vote casting module 406 obtains the number of votes available from vote calculator module 404. Vote casting module 406 then sends voting information to the vote coordinator module 420. The voting information contains sufficient information to allow other shards to subsequently request the execution plan, should the vote be successful. This information may comprise a shard identifier, an execution plan identifier, and a value indicating the number of votes being cast for that execution plan. As noted, the number of votes that vote casting module 406 may cast is limited by an amount determined by vote calculator module 404.

When each vote casting module 406 has cast its vote, vote coordinator module 420 selects the query plan with the most votes. In some embodiments, two or more vote casting modules 406 may cast votes for the same execution plan. If so, their votes may be added together and that value used to determine the winning plan.

After determining the winning plan, vote coordinator module 420 notifies each shard of the outcome and provides enough information for the shards to begin using the plan, by obtaining plan information via plan information module 430 and forwarding the information to each shard. Other embodiments may utilize different means of notifying the shards of the preferred plan, and for initiating use of the preferred plan.

A globally optimized execution plan may also be determined by a central authority. In an embodiment, each shard sends information about its execution plan to a central authority that evaluates and compares each plan. The central authority determines the globally optimized plan and broadcasts information about that plan to each shard.

Figure 5:
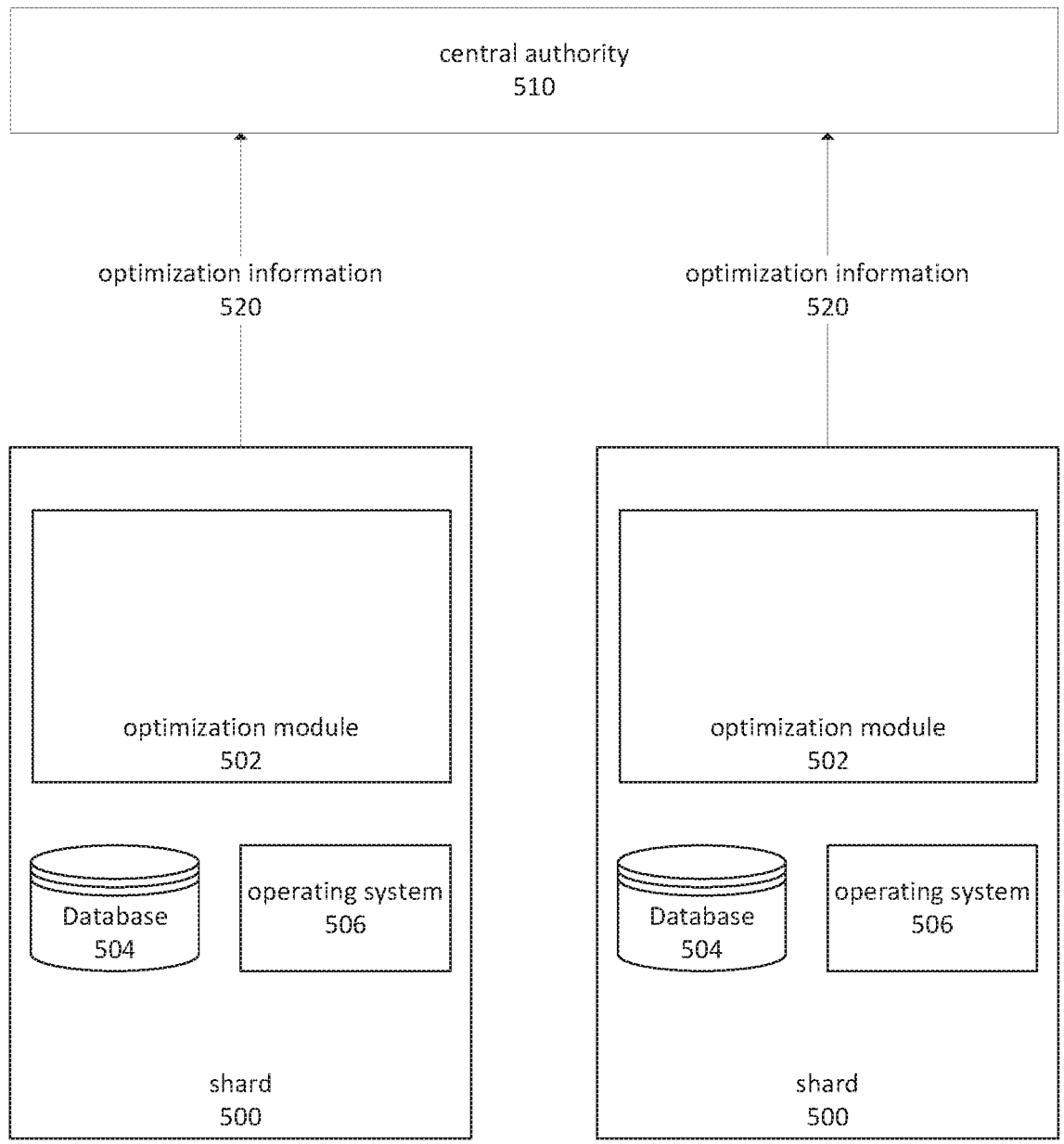
FIG. 5 depicts an embodiment for selecting a globally optimized execution plan by a central authority.

FIG. 5 depicts an embodiment that determines a globally optimized execution plan by utilizing a central authority. Shards 500 send optimization information 520 to central authority 510. Optimization information may comprise one or more of query plan information, query statistics, and hardware characteristics information. Execution plan information may be represented by a data structure similar to the one depicted in FIG. 6. Central authority 510 may then compare the cost of each plan and select the cheapest, according to the various embodiments for comparing the costs of execution plans, as described herein.

Some of the optimization information 520 may be transmitted at a time prior to the cost comparison. Central authority 510 may actively retrieve the factors from each shard 500. Alternatively, each shard 500 may transmit aspects of optimization information 520 based on a variety of triggering factors. In various embodiments the relevant factors may be transmitted, for example, periodically or when the information has significantly changed.

In various embodiments, a communications mechanism must be employed to distribute information about execution plans. While selection of a globally optimized plan is ongoing, it may be preferable to transmit a limited quantity of information about the plan. The transmitted information may therefore be limited to what is needed for comparison between plans. Various means may be employed to transmit the information, such as broadcast or point-to-point communication. After the globally optimized plan has been selected, more complete information may be needed to allow the plan to be employed. Both broadcast and point-to-point communication, among other means, may be employed to communicate this information. Point-to-point communication may be preferable, however, due to the comparatively larger amount of data involved.

Figure 6:
FIG. 6 depicts an embodiment of a data structure for communicating execution plan information for comparison.

FIG. 6 depicts an embodiment of data structure 600 containing information useful for comparing execution plans. Various embodiments may utilize this or a similar structure for sending plan information between shards. Those of ordinary skill in the art will recognize that the elements comprising the data structure are only illustrative. Alternative embodiments may remove, replace, or add the elements described herein.

A source identifier 602 identifies the source of the execution plan information, which may be a shard on which the plan was generated. The identifier may be any type of value that serves to identify the source, such as a globally unique identifier, uniform resource locator, or internet protocol address. In an embodiment, when the receiving shard determines that the sender has a preferred plan, it may request additional information concerning the plan from the source identified by 602.

An execution plan identifier 604 identifies the execution plan. It may be of any type of value that serves to identify the execution query plan, such as a globally unique identifier, and may be used in a request to obtain full information about the identified execution plan from the source identified by 602.

A query identifier 606 serves to identify the query to which the plan applies. It may be any type of value that serves to identify the query, such as a globally unique identifier or the text of the query itself.

A domain identifier 608 indicates the domain to which the shard belongs. In this context, the domain refers to a group of shards that participate in determining a globally optimized query. Typically, the domain will correspond to all of the horizontal partitions for a given table, although other arrangements may be advantageous. The shards that comprise a domain do not necessarily include all of the shards involved in managing a partitioned table.

A cost indicator 610 provides a measurement of the plan's cost. The cost indicator may be a simple scalar value, one or more vectors of scalar values, or other means of conveying cost information. In an embodiment, the cost indicator is a vector of values corresponding to steps in the set of steps that comprise the execution plan.

Figure 7:
FIG. 7 depicts an embodiment of a data structure for communicating execution plan information sufficient to allow the execution plan to be used by an execution engine.

FIG. 7 depicts an embodiment of a data structure 700 for transmitting more complete execution plan information. The structure is intended to contain sufficient information to allow a shard to begin using the execution plan to execute corresponding queries. In general, this information is more costly to transmit than the information needed to compare plans. Accordingly, it may be preferable to transmit detailed information concerning an execution plan only after it has been determined to be optimized.

The data structure 700 may contain an identifier 702 of the source of the execution plan, which may be any type of value that serves to identify the source, such as a globally unique identifier, uniform resource locator, or internet protocol address. A second identifier 704 identifies the plan itself, and may be any type of value that serves to identify the plan, such as a globally unique identifier. A third value 706 identifies the query to which the plan applies. It may be any type of value that serves to identify the query, such as a globally unique identifier or the text of the query itself.

In addition, the data structure may contain metadata 708 representing the execution plan in detail sufficient to load the execution plan into the shard's query optimizer. This may comprise execution plan details 710. In some embodiments, the metadata may be provided to a database via an application programming interface. The database will process corresponding queries using the supplied execution plan after the programming interface is invoked.

A variety of means may be employed to compare the predicted cost of two execution plans. In some circumstances, it may be advantageous to directly compare cost figures provided by the query optimizer, without any adjustment. However, a variety of factors may make unadjusted cost comparisons misleading. For example, relatively fast CPU performance on one of the shards may decrease the cost estimates produced by that shard's query optimizer, even though the associated execution plans perform poorly on shards in the domain that have slower processors.

In an embodiment, the cost figures for each execution plan are adjusted based on the performance characteristics of the shard that produced the execution plan. A scalar cost figure may be multiplied by an adjustment factor to produce an adjusted cost figure suitable for comparison with other shards. The adjustment factor may be based on the overall performance characteristics of the shard. Numerous performance and database metrics may be employed, such as CPU speed, memory capacity, storage device read performance, storage device write performance, storage device seek time, row count, and duplication of data.

Figure 8:
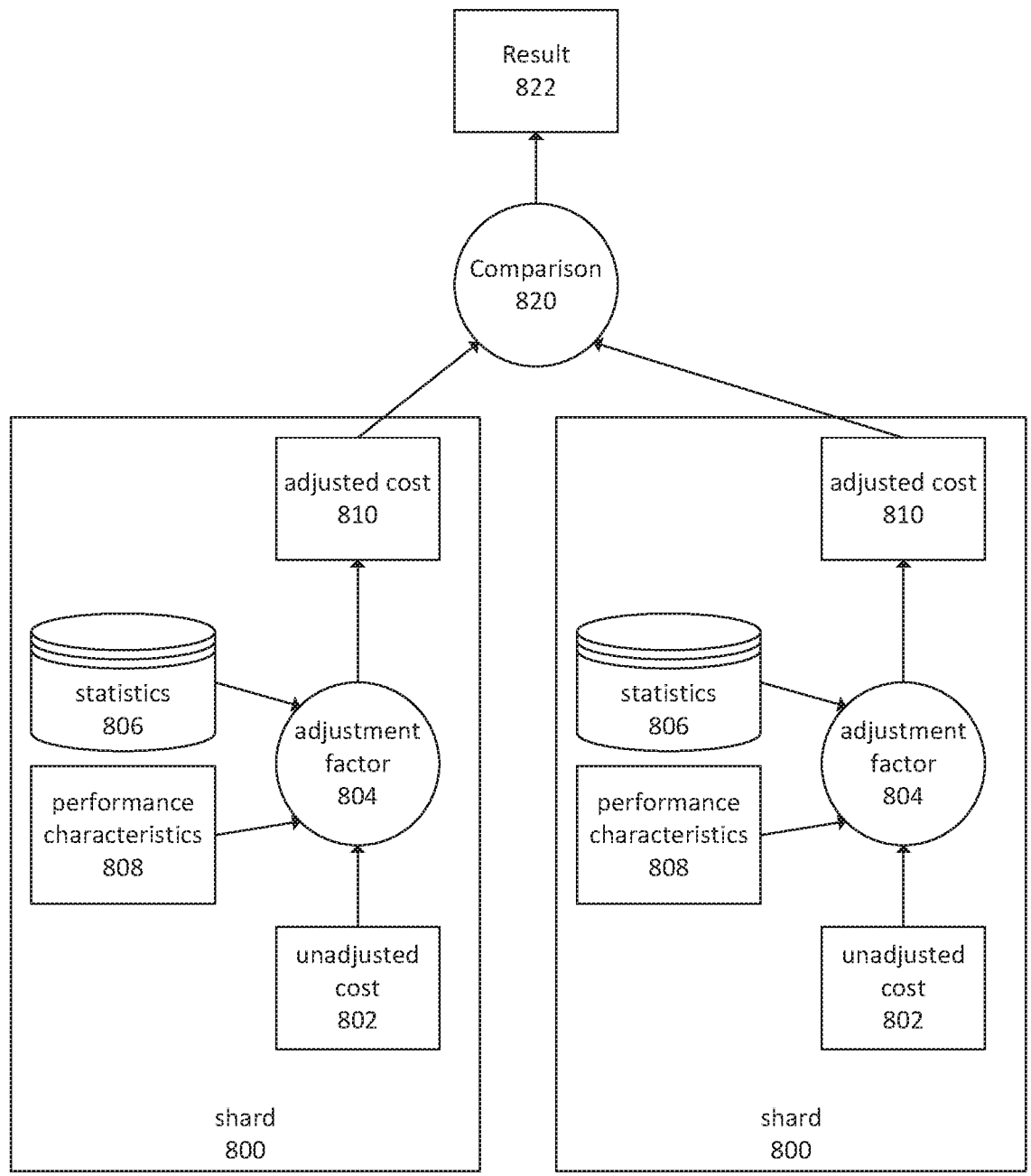
FIG. 8 depicts an embodiment of cost comparison using cost adjustment.

FIG. 8 depicts an embodiment capable of cost comparison. Each shard 800 produces an execution plan with an associated unadjusted cost 802. Each shard calculates an adjustment factor 804 based on some combination of query statistics 806 and performance characteristics 808. Other factors not depicted in the figure, such as manual adjustments by technical personnel, may also be used in the calculation. Typically, the unadjusted cost 802 is multiplied by the adjustment factor 804 to produce adjusted cost 810, though other mathematical or logical operations may be employed to produce adjusted cost 810. The adjusted costs 810 from each execution plan are then compared by comparison function 820, to produce result 822.

Figure 9:
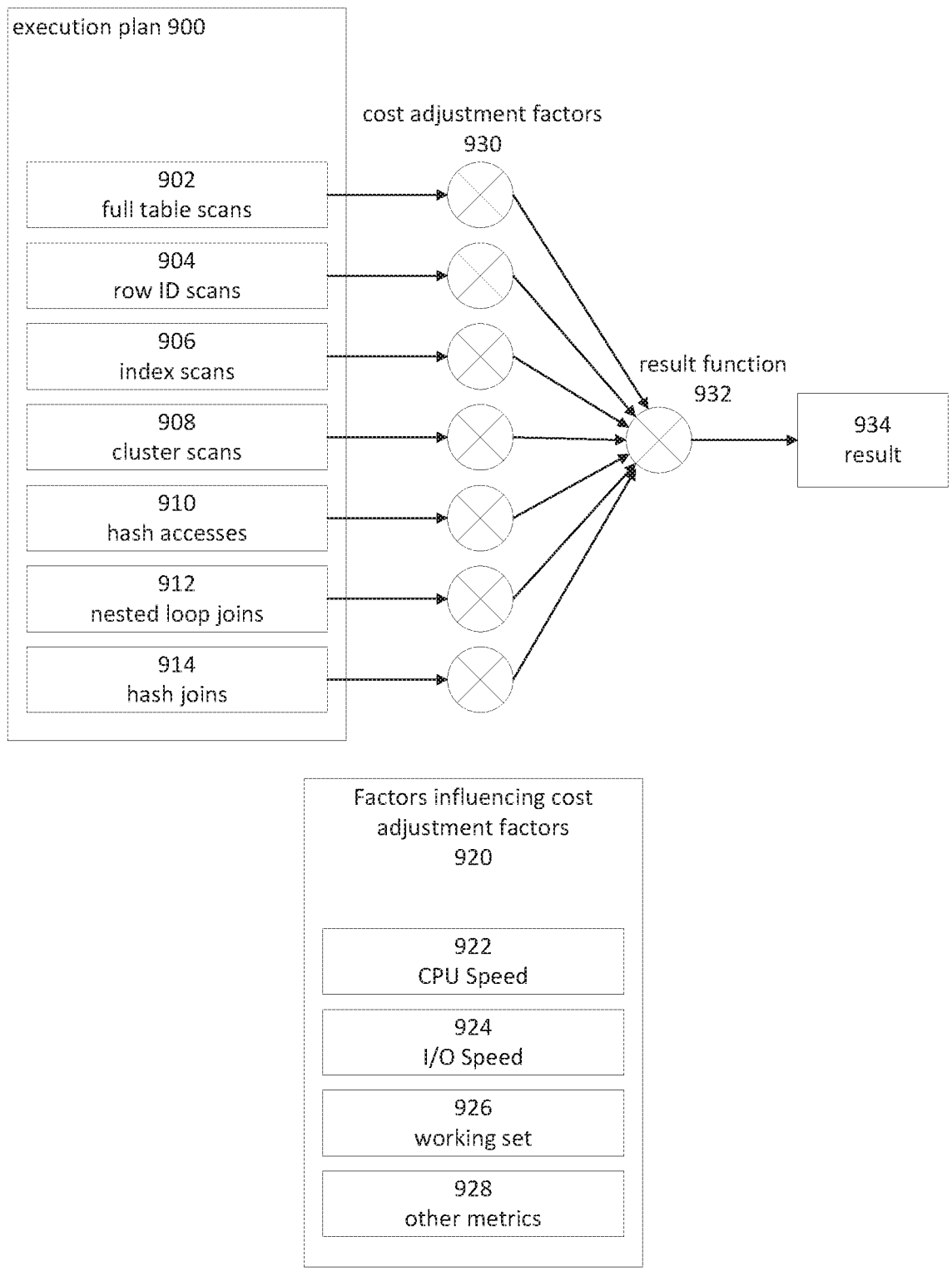
FIG. 9 depicts an embodiment of cost comparison using individual adjustment of steps in an execution plan.

FIG. 9 depicts an embodiment in which the costs of individual components of the access plan are adjusted based on relevant performance characteristics. In this manner, the cost adjustment can be made more accurate by weighting characteristics that are more likely to influence the cost calculation. For example, a full table scan may be more likely to be influenced by the performance of a shard's disk drive than by CPU speed. Therefore, the cost factor for a table scan can be adjusted primarily based on disk performance rather than the speed of the CPU.

Execution plan 900 contains a variety of operation types 902-914. Each operation type has an associated unadjusted cost which reflects the total cost of all operations of that type. Each unadjusted cost is adjusted by the use of an associated cost adjustment factor 930, determined with reference to relevant statistics and performance characteristics 920. The set of statistics and performance characteristics used in the determination may vary according to the operation type with which the adjustment factor is associated. For example, an adjustment factor 930 associated with the hash access operation type 910 might be adjusted based only on CPU speed 922, or primarily on CPU speed 922 with working set 926 as a secondary consideration. Many other types of metrics may also be considered. In addition to relatively static measurements such as the amount of physical memory or CPU speed, dynamic performance metrics may be collected and used. Various non-limiting examples are working set, CPU utilization, average disk queue depth, and so forth. Performance metrics collected by the execution engine may also be considered. In the database context, various non-limiting examples include cache coherence measurements, average number of user sessions, and various event log entries.

In various embodiments, the optimized execution plan is periodically recalculated. Recalculation may be desirable due to changing conditions on the shards in the domain. For example, during operation the shards may store additional data, possibly resulting in a changed distribution of data throughout the domain of shards. If so, what was once a globally optimized execution plan may have become inefficient, and a new determination of a globally optimized execution plan may become desirable.

A new determination of a globally optimized execution plan may proceed in a manner similar to that employed initially. In an embodiment, each shard recalculates its own locally optimized execution plan and the globally optimized plan is selected according to the various embodiments described herein. In some cases, however, it may be desirable to recalculate only a subset of locally optimized plans. In an embodiment, each shard may determine a new locally optimized plan only if some set of characteristics, such as table size, has changed beyond a threshold amount.

The recalculation of the globally optimized execution plan may be triggered by a variety of events or conditions. For example, it may be triggered on a periodic basis such as one per week. Alternatively, it may be done on an opportunistic basis when one or more of the shards are idle. In one embodiment, when a shard is otherwise idle it recalculates its locally optimized execution plan and triggers a recalculation of the globally optimized plan only if the cost of the locally optimized plan has significantly changed. Other trigger events for recalculation of the globally optimized plan include when the amount of data stored on a shard has changed significantly, or when a shard's hardware configuration has changed.

One advantage of shard-based architectures is that new shards can be added when additional capacity is needed. However, the new shard may perform less than optimally while it builds up a cache of statistics and generates new execution plans. It would be advantageous for the new shard to be automatically populated with execution plans already determined to be globally optimized. Subsequently, the new shard can calculate locally optimized execution plans and the embodiments described herein for determining globally optimized execution plans can then be performed in conjunction with the new shard.

In some instances a client application will issue queries that are executed more or less evenly across the shards in the system. This tends to occur when the application requests data that is evenly distributed across the horizontal partitions assigned to each shard. In other cases, a client application may issue queries heavily skewed towards a single partition. In the latter case, overall system performance may be improved by allowing an individual application to override the globally optimized execution plan for queries executed on its behalf.

In other embodiments, the system may supply hints to a client application. A hint may include suggestions that influence generation of a execution plan and execution of the query itself. A hint may, for example, suggest that a full table scan is preferable to an index scan when a particular query is executed. Many other types of hints are both possible and contemplated. The hints supplied to the client application may be determined by a variety of means. In one embodiment, potential hints are evaluated based on cost reduction. Hints that optimize the cost of repeated query execution across a domain are made available to the client application. The client may then include the supplied hint when it executes the query. When a shard receives the query, it processes the hint and executes the query in a manner consistent with optimized performance of the domain. Those of ordinary skill in the art will recognize that the embodiments just described can be practiced in addition to or instead of other embodiments described in the present application.

Client applications may receive hints in a variety of ways. A broadcast system may be employed so as to send hints to one or more interested client applications. This approach has the advantage of being able to rebroadcast updates as new or different hints are generated. Alternatively, each application may directly request available hints. Additional embodiments suitable to the particular hardware and software environment are also contemplated.

In further embodiments, hints may be supplied from a shard-based system to engineers and other technical staff. In an embodiment, a shard may supply a hint indicating that its plan is significantly cheaper than the currently selected globally optimized plan, suggesting that a recalculation of the globally optimized plan, or an override of it, may be desirable. Hints may be transmitted to users in a variety of ways. Non-limiting examples include being stored on a hard drive accessible to the intended user, sent via email or messaging, or placed in a queue for later processing.

In other embodiments, the system supplies hints for use by software engineering staff that allows optimization of client application programs. A hint may suggest that the engineer manually modify the queries sent from a client application to a shard-based system. The hint may, for example, suggest that an index scan is preferable to a full table scan for a particular query, according to a determination of a globally optimized execution plan. The software engineer might then modify the application, causing it to issue queries more likely to conform to the desired globally optimized plan. In other embodiments, hints may also be used to change other aspects of executing a query. For example, the hints may indicate, directly or indirectly, that the query should be executed on a particular shard, or that a particular shard should be avoided. The hints might also show that the query requires execution across multiple shards, suggesting to personnel that a reformulation of the query is desirable.

Figure 10:
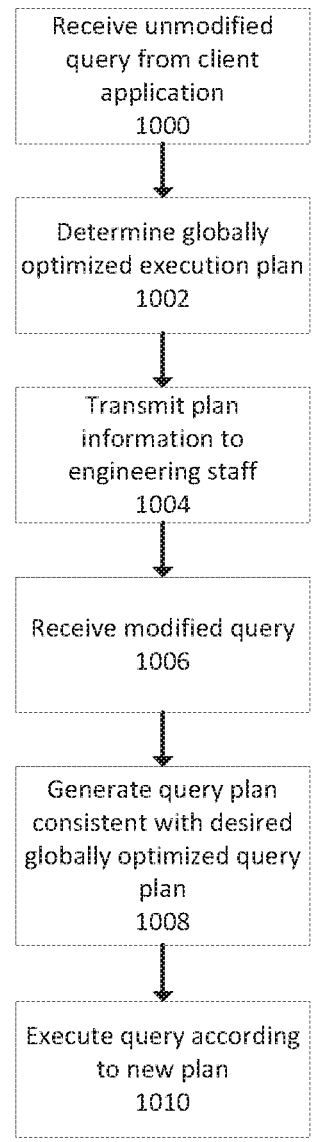
FIG. 10 depicts an embodiment of using hints to modify a query so that resulting execution plans conform with a desired globally optimized execution plan.

FIG. 10 depicts an embodiment of this approach. Although depicted as a sequence of operations, those of ordinary skill in the art will appreciate that the order of the operations may vary, and that operations may be added, modified, or removed.

At operation 1000, the shard-based system receives and processes a query from a client application. A globally optimized execution plan is then generated at operation 1002. However, rather than directly causing the shards to adopt the query, the system may send information about the globally optimized execution plan to engineering staff, operation 1004. The information may comprise a description or explanation of the execution plan sufficient to allow the engineer to make the desired modifications to the application. It may, for example, include a description of the optimized execution plan's set of instructions and the associated cost.

At operation 1006, the system receives a query modified according to the information provided in operation 1004. A new query plan is then generated for the modified query, operation 1008. Because of the modifications made to the query, the new execution plan is generated in a manner consistent with the desired globally optimized plan. To explain further, a hint may indicate that a globally optimized execution plan would use full table scans instead of index scans, even though an unmodified plan results in an index scan when it is processed by the query optimizer. The modified query includes instructions indicating to the query optimizer that full table scans are preferred. Therefore, the query optimizer produces an execution plan using a full table scan, and the resulting query is consistent with the desired globally optimized plan. After the new plan is generated, the query may be executed using that plan, operation 1010.

Figure 11:
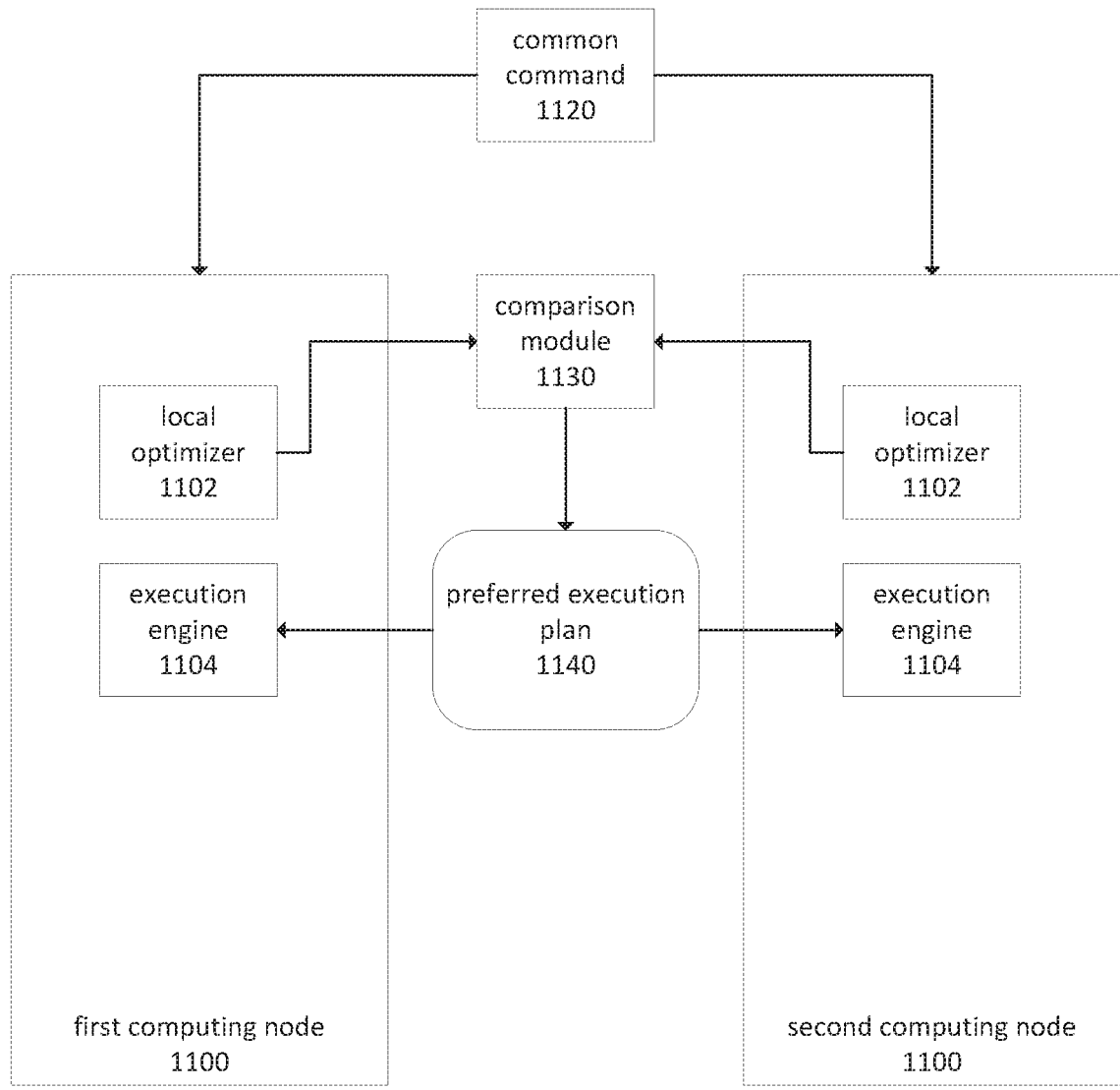
FIG. 11 depicts an embodiment of using a system for utilizing a global optimization process in conjunction with computing nodes having an execution engine and a local optimizer.

For illustrative purposes, some of the embodiments described herein refer to data management systems with horizontally partitioned data. However, those of skill in the art will appreciate that aspects of the disclosure may be applied to systems that do not involve conventional databases. Examples include, but are not limited to, state machines and workflow engines. FIG. 11 depicts an embodiment in which the global optimization techniques described herein may be applied. First and second computing nodes 1100 are capable of receiving and processing a common command 1120. The command may be of any type, provided it can be executed on multiple computing nodes in a domain and can be decomposed into a sequence of steps whose total cost can be estimated. State machines and workflow engines are examples of systems that process commands that fit these criteria. Both are comprised of a set of states with associated transitions. Performing a query comprises a set of transitions from a current state to a state in which the command has been executed. Any shard capable of reaching the command complete state is able to process the command, and the cost of doing so may be estimated based on the estimated cost of all transitions required to reach that state. An execution engine may perform the query by causing a desired set of transitions to occur, following an optimized or otherwise preferred plan chosen, for example, by a query optimizer. The data managed by each shard may manage a partition of a partitioned data set, so that the domain of shards collectively manages the entire set. The partitions may be overlapping, so that some or even all of the data is duplicated between shards. A data set may comprise any type of data, including but not limited to tables, vectors, arrays, graphs, and so on.

The sequence of steps and the predicted costs are determined by local optimizer 1102. Comparison module 1130 compares the predicted cost of the two plans, with reference to factors such as execution statistics, relative hardware performance characteristics, and the relative frequency with which each system executes the common command. The result of the comparison is a preferred execution plan 1140, which may be utilized by execution engine 1104 as depicted by the connecting arrows between preferred execution plan 1140 and execution engine 1104. Other various embodiments for using a preferred plan, such as in conjunction with supplying hints to applications or technical support staff, may also be employed.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed:

1. A non-transitory computer-readable storage medium having stored thereon instructions that, when executed by a computing device, cause the computing device to at least:
    obtain, from a first query optimizer of a first computing node, a first plan for executing a query on the first computing node;
    obtain, from a second query optimizer of a second computing node, a second plan for executing the query on the second computing node;
    obtain a first number of votes cast by the first computing node, wherein the first number of votes is based on a first characteristic of the first computing node;
    obtain a second number of votes cast by the second computing node for the second plan, wherein the second number of votes is based on a second characteristic of the second computing node;
    determine, based on comparing the first number of votes associated with a first predicted execution cost of executing the first plan with the second number of votes associated with a second predicted execution cost of executing the second plan, that the first plan for executing the query on the first computing node is preferred for executing the query on the second computing node, wherein the first predicted execution cost is based at least in part on a first performance characteristic of the first computing node and the second predicted execution cost is based at least in part on a second performance characteristic of the second computing node; and
    cause, based on the comparison, the second computing node to execute the query using the first plan.

2. The non-transitory computer-readable storage medium of claim 1, wherein the computer-readable storage medium has stored thereon further instructions that, when executed by the computing device, cause the computing device to at least:
    receive, from a third computing device, information indicative of a vote for using the second plan.

3. The non-transitory computer-readable storage medium of claim 2, wherein the third computing device is allocated votes based at least in part on an amount of data stored on the third computing device.

4. The non-transitory computer-readable storage medium of claim 1, wherein the computer-readable storage medium has stored thereon further instructions that, when executed by the computing device, cause the computing device to at least:
    receive information indicative of overriding the determination that the first plan is preferred for executing the query.

5. The non-transitory computer-readable storage medium of claim 1, wherein the computer-readable storage medium has stored thereon further instructions that, when executed by the computing device, cause the computing device to at least:
    transmit a hint to a client, the hint indicative of conforming the first plan for executing a query to a globally optimized execution plan.

6. The non-transitory computer-readable storage medium of claim 1, wherein the comparing comprises adjusting the first execution cost of executing based at least in part on the first performance characteristic of the first computing node.

7. A method of executing a query in a distributed database, the method comprising:
    receiving, from a first query optimizer, a first plan for executing a query on a first partition of the distributed database;
    receiving, from a second query optimizer, a second plan for executing the query on a second partition of the distributed database;
    determining a first predicted execution cost of executing the first plan and a second predicted execution cost of executing the second plan, wherein the first predicted execution cost is based at least on one or more first characteristics of computing resources associated with executing queries on the first partition; and
    causing the second computing device to execute the query using the first plan, based at least in part on comparing a first number of votes cast in favor of using the first plan and a second number of votes cast in favor of using the second plan.

8. The method of claim 7, wherein the first predicted execution cost of executing the first plan corresponds to executing the first plan on both the first partition and the second partition.

9. The method of claim 7, further comprising:
receiving, from a third partition of the distributed database, information indicative of a vote for using the second plan.

10. The method of claim 7, further comprising:
determining a number of votes for selecting a query plan to allocate to the first partition, the determining based at least in part on an amount of data stored on the first partition.

11. The method of claim 7, wherein the first partition is a first horizontal partition of a table and the second partition is a second horizontal partition of the table.

12. A system, comprising:
at least one processor; and
at least one memory comprising instructions that, in response to being executed by the at least one processor, cause the system at least to:
  obtain, from a first query optimizer, a first plan for executing a query on a first computing node, the first plan generated on the first computing node;
  obtain, from a second query optimizer, a second plan for executing the query on a second computing node, the second plan generated on the second computing node;
  obtain a vote for the first plan, the vote cast for the first plan based on comparing a first predicted execution cost of executing the first plan on the first computing node and the second computing node with a second predicted execution cost of executing the second plan on the first computing node and the second computing node, that the first plan is preferred for executing the query on the second computing node; and
  cause, based on determining that the first plan is preferred based at least in part on the vote, the second computing node to execute the query using the first plan.

13. The system of claim 12, wherein the first plan is determined based on query statistics of the first computing node.

14. The system of claim 12, wherein the at least one memory comprises further instructions that, in response to being executed by the at least one processor, further cause the system to:
  adjust a first predicted execution cost of executing the first plan on the first computing node by a first execution cost factor; and
  adjust a second predicted execution cost of executing the second plan on the second computing node by a second execution cost factor.

15. The system of claim 14, wherein the first plan is determined to be preferred based at least in part on one or more of performance characteristics of the first computing node, data stored on the first computing node, and frequency of executing the query on the first computing node.

16. The system of claim 12, further comprising:
adjusting the first predicted execution cost by an execution cost factor and comparing the adjusted execution cost with the second predicted execution cost of the second plan.

17. The system of claim 16, wherein the execution cost factor is based at least in part on relative performance characteristics of the first and second computing nodes.

18. The non-transitory computer-readable storage medium of claim 1, wherein the computer-readable storage medium has stored thereon further instructions that, when executed by the computing device, cause the computing device to at least:
  obtain the first number of votes from the first query optimizer; and
  obtain the second number of votes from the second query optimizer.

19. The method of claim 7, wherein the second predicted execution cost is based on at least one or more second characteristics of the second computing node.

20. The system of claim 12, wherein the at least one memory comprises further instructions that, in response to being executed by the at least one processor, further cause the system to:
  adjust a first predicted execution cost of executing the first plan on the first computing node by a first execution cost factor.

* * * * *